United States Patent [19]
Sargent

[11] 3,939,501
[45] Feb. 24, 1976

[54] TOILET
[75] Inventor: Frank T. Sargent, Jacksonville, Fla.
[73] Assignee: Thetford Corporation, Ann Arbor, Mich.
[22] Filed: Nov. 1, 1974
[21] Appl. No.: 519,804

[30] Foreign Application Priority Data
Nov. 22, 1973 United Kingdom............... 54343/73

[52] U.S. Cl. ................................. 4/78; 4/80; 4/85; 4/90; 4/115
[51] Int. Cl.² ........................................ E03D 11/10
[58] Field of Search ............ 4/10, 141, 76, 138, 79, 4/77, 89, 78, 115, 111, 116, 110, 131, 142; 137/525.1, 512; 251/298, 299, 300, 303, 61.1

[56] References Cited
UNITED STATES PATENTS

| | | | |
|---|---|---|---|
| 2,732,167 | 1/1956 | Stout et al. ........................ | 251/61.1 |
| 2,793,371 | 5/1957 | Vesconte ..................... | 137/525.1 X |
| 3,047,013 | 7/1962 | Baumbach ............................ | 4/76 X |
| 3,468,511 | 9/1969 | Haskins............................... | 251/61.1 |
| 3,504,381 | 4/1970 | Dewey ................................. | 4/76 |
| 3,565,106 | 2/1971 | Baumbach .................... | 137/525.1 X |
| 3,801,991 | 4/1974 | Fulton et al. ........................... | 4/115 |
| 3,858,249 | 1/1975 | Howard ..................... | 4/10 |

Primary Examiner—Henry K. Artis
Attorney, Agent, or Firm—Olsen and Stephenson

[57] ABSTRACT

A self-contained portable toilet that has a bowl which is mounted on a support bucket or holding tank. The bowl has an outlet port for discharging the contents of the bowl into the bucket, and a closure means for the outlet port is provided which comprises a flexible diaphragm movable between a first position in which it closes the port and a second position in which it uncovers the port. Means are provided to tension the diaphragm into contact with the outlet port when the diaphragm is in its first position so as to seal the port closed. A flush lever is provided for moving the diaphragm between its first and second positions. A flush water storage chamber is contained within the portable toilet and a hand pump is provided in association with the storage chamber for discharging flush water into the bowl.

18 Claims, 6 Drawing Figures

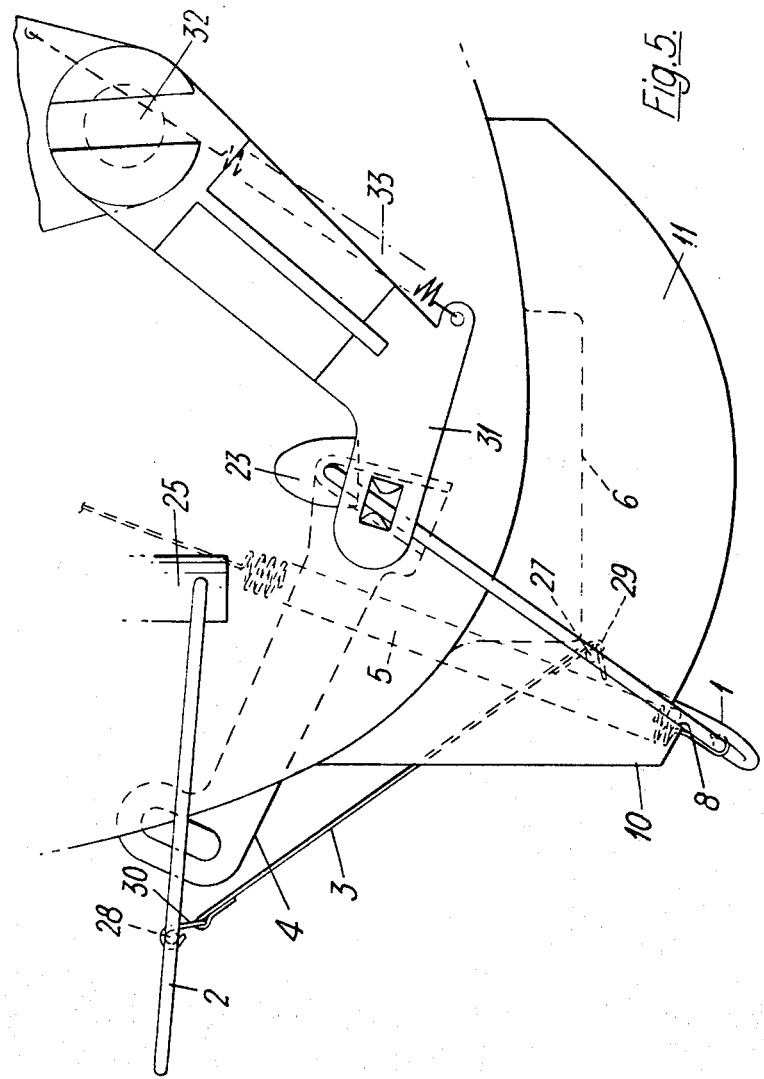

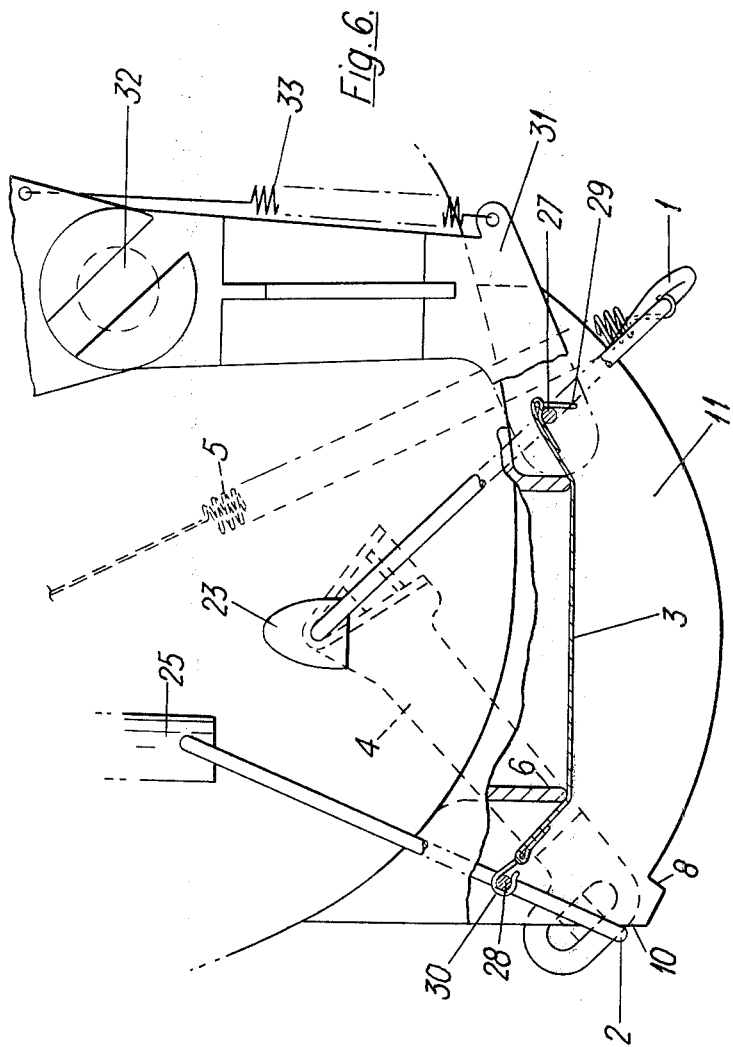

TOILET

BACKGROUND OF THE INVENTION

The present invention relates to toilets, and in particular to portable toilets.

Various types of portable toilet are known, the simplest form being, essentially, a bucket provided with a seat. This type, although relatively inexpensive, is generally unsatisfactory, because it tends to give off an unpleasant odor, even when treated with chemicals. A further form is a flushing toilet provided with filters and a pump, in which the water content of the waste matter is cleaned and is recirculated. Such a construction has a disadvantage that it is expensive and the filters can tend to clog. A further form has a bowl section and a collecting section, thereunder, the outlet to the bowl section being provided with a valve of the pivotal flap type or of the sliding valve type. The pivoting flap valve is generally unsatisfactory, because it tends to dip into the waste matter in the collecting section. The slide valve, on the other hand, is usually satisfactory from a working point of view, but it can be rather cumbersome and expensive.

SUMMARY OF THE INVENTION

According to the present invention there is provided a toilet comprising a bowl having an outlet port, a flexible diaphragm movable between a first position, in which it closes said outlet port, and a second position, in which it uncovers said outlet port, and means to tension said diaphragm into contact with said outlet port when it is in said first position.

A toilet constructed in accordance with the invention can be manufactured inexpensively and yet still provide a good seal, preventing odors from escaping. The diaphragm can, for example, be formed of rubber or rubberised fabric. Preferably the diaphragm is supported between two movable members, one abutting a stop in the first position and the other then being resiliently urged away therefrom to tension the diaphragm into contact with said outlet port. The two movable members may then be in the form of two pivotable crank members, one being secured to one end of the diaphragm and the other being secured to the other end of said diagphragm, the crank members advantageously being pivotable about different axes.

The crank members may each be provided with cross bars, upon which the ends of the diaphragm are mounted, the cross bars being so disposed in the first position of the diaphragm that the outlet port extends beyond the straight line connecting the two cross bars, so that the diaphragm is placed in firm contact with the outlet port.

A tension spring may be arranged as an overcenter spring to urge the other crank, in said first position, to tension the diaphragm and in said second position to urge said diaphragm into the open position, in which case a second stop may be provided to restrain the other crank when the diaphragm is in the second position. With this construction, a connection member may join the cranks together, the connection member being slidable with respect to at least one of the cranks, and an actuating lever may be pivotally mounted with respect to the bowl and be slidably connected to the other crank, whereby rotation of the actuating lever first of all causes pivoting of the other crank in the direction to release the tension in the diaphragm, and then causes pivoting of the two cranks together, to move the diaphragm into its second position. Such an arrangement is an extremely simple construction and yet provides an effective odor-tight seal.

In order to prevent the waste material splashing, guards may extend on either side of the diaphragm and the outlet port, in a direction parallel to the direction of movement of the diaphragm from its first to its second position, the guards being closely adjacent to the diaphragm at least in its closed position.

In order that the invention may be more readily understood, the following description is given, merely by way of example, reference being made to the accompanying drawings in which:

BRIEF DESCRIPTION OF THE DRAWINGS

FIG. 5 is an enlarged view showing the diaphragm in its open position; and

FIG. 6 is a view similar to FIG. 5 showing the diaphragm in its closed position.

DESCRIPTION OF THE PREFERRED EMBODIMENT

Figure 1:
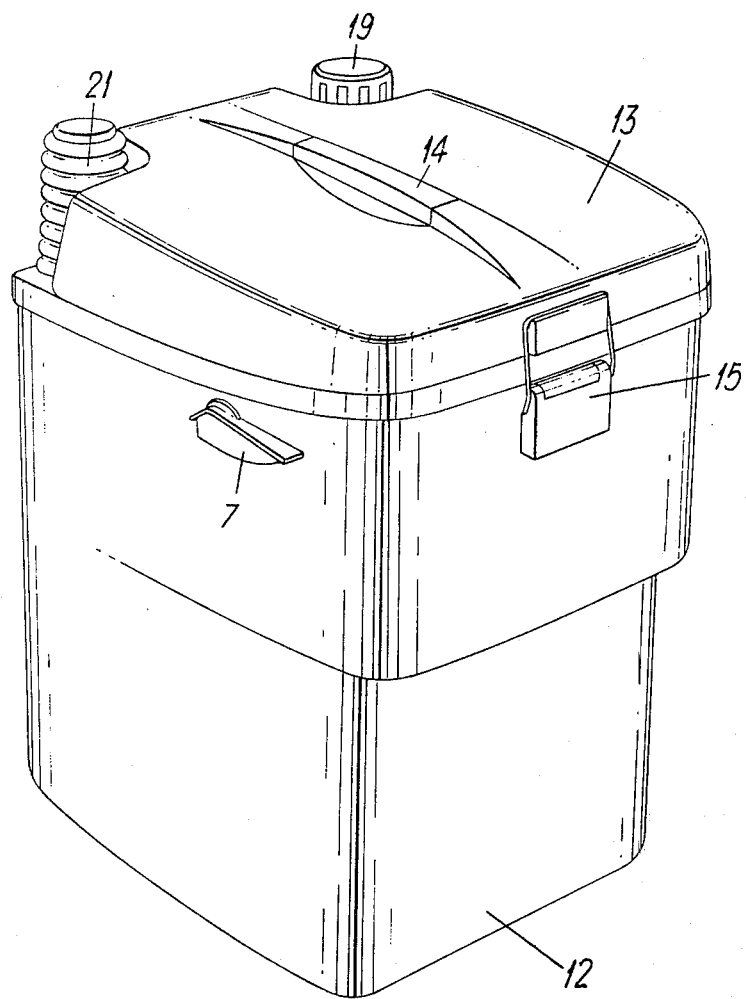
FIG. 1 is a perspective view of one embodiment of toilet according to the invention.

The sealing mechanism for the bowl section of the toilet of the present invention is best illustrated in FIGS. 2 to 6. In general terms the mechanism comprises a drive crank 1 and a driven crank 2. They are connected together in two ways, firstly by a rubber diaphragm 3, by means of which the drive crank 1 pulls the drive crank 2 and secondly by a connecting rod 4 by means of which the drive crank 1 pushes the driven crank 2.

An extensible toggle spring 5 is attached to the drive crank at one end, the other end being attached to the upper portion of the bowl at a point substantially higher than the pivot point of the drive crank 1.

The toggle spring 5 is an extension coil spring. Due to the geometry of its motion with respect to the geometry of the motion of the drive crank 1, the length in the open and closed positions of the drive crank 1 is substantially shorter than the length at the midpoint of the motion. Thus the coil toggle spring 5 holds the mechanism securely against stops, in both the fully open and the fully closed positions of the diaphragm, as explained in greater detail later.

In the closed position, the pull of the toggle spring 5 on the drive crank 1 continues to exert tension on the diaphragm 3, thus providing a gas-tight, odor-tight seal, which also can serve to contain water in the toilet bowl, if required.

The end of the toilet bowl outlet port 6 (FIGS. 5 and 6) extends through a straight line formed by the diaphragm 3, when the drive crank and the driven crank are in their closed positions, as can clearly be seen from FIG. 6. Although this cannot be seen clearly in the drawings, the end of the outlet port 6 is curved being concave as viewed from either the left or the right in FIG. 6. Such a shape ensures that uniform pressure is applied by the diaphragm 3 to the entire circular end of the outlet port 6.

An external actuating lever 7 is situated on the exterior of the toilet unit. It is mounted on two bearings and transmits rotary power to the drive crank 1. It is only necessary to turn this actuating lever through 60° of rotation, to open or close the diaphragm 3 fully.

Turning now to the details of the construction of the invention, the toilet includes a bucket section 12, (FIG. 1) which is surmounted by a pivotal seat (not shown) and a lid 13 having a central handle 14 with a recess thereunder. The handle 14 is normally flush with the top of the lid and is connected by two flexible resilient plastic strips having enlarged heads, so that one can first of all put one's hand under the handle and lift slightly and then further movement enables the whole toilet to be lifted, since the lid 13 is pivoted at its rear and can be secured in place by a clamp 15 at the front.

At the upper part of the front, the bucket houses a flushing water tank 16 provided with a filling pipe 17 which finishes at the rear of the toilet at one side thereof, in a vertical filling tube 18 having therein a light ball, e.g., a ping-pong ball, and surmounted with a fitting cap 19.

Figure 2:
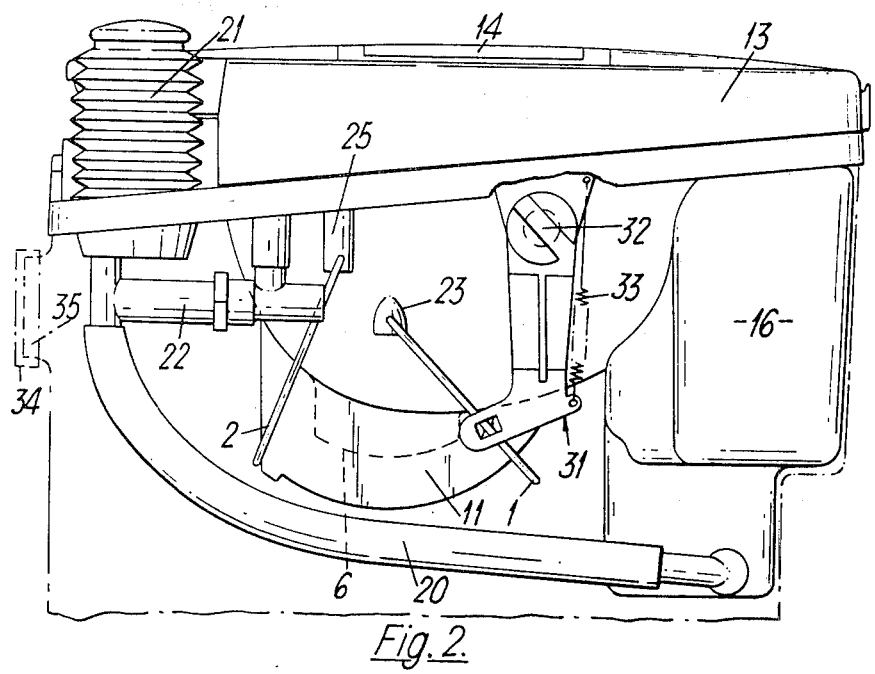
FIG. 2 is a partial side elevation of one side of the toilet of FIG. 1, with the bucket portion shown in phantom to reveal the interior and the operating mechanism.
Figure 4:
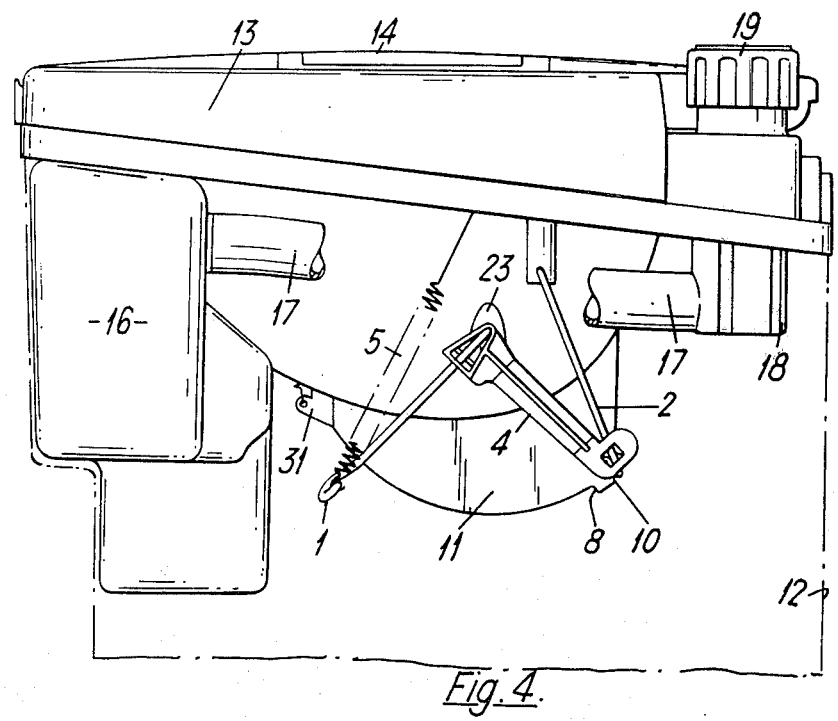
FIG. 4 is a corresponding side elevation of the other side of the toilet.

As can be seen from FIG. 2 from the foot of the tank 15, extends a pipe 20 which is connected to the inlet of a bellows pump 21, the outlet 22 of which is joined to a tube which extends around the rim of the bowl and is provided with a number of outlets opening into the bowl.

Figure 3:
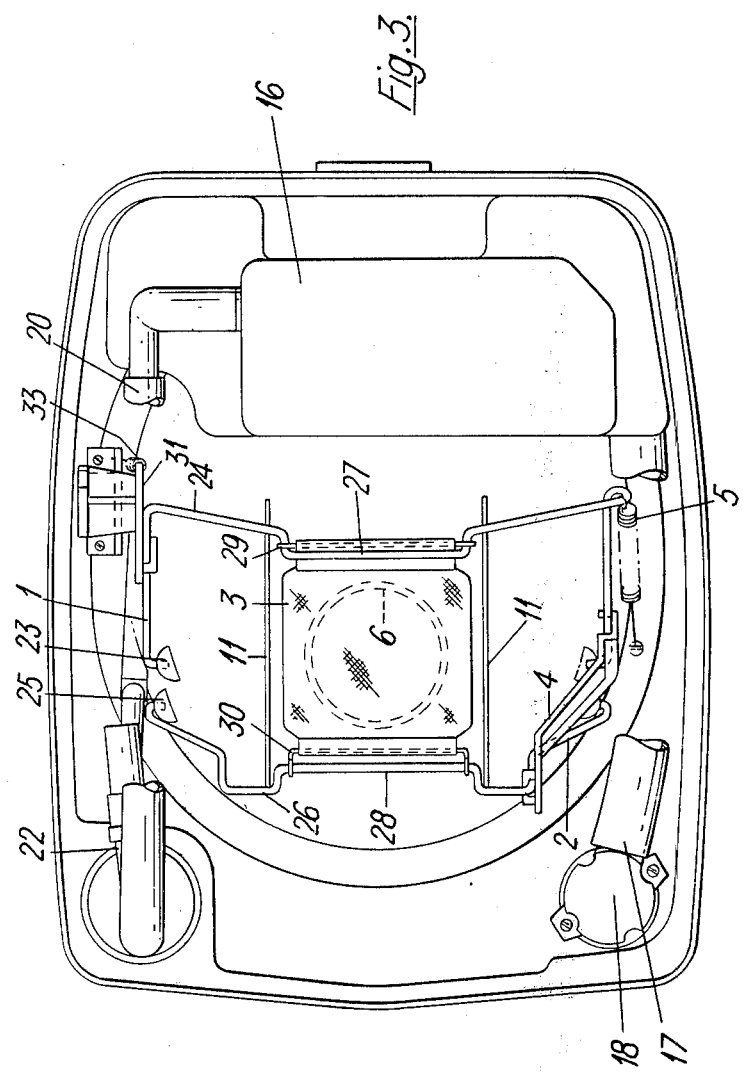
FIG. 3 is an underneath plan view of the mechanism illustrated in FIG. 2.

The crank 1 is formed of two side arms each of which is pivotable in a hinge block 23 (FIG. 6) and a cross bar 24 which is illustrated in greater detail in FIG. 3. Similarly the crank 2 is provided with two side arms pivoted in a block 25, spaced from block 23 and is also provided with a cross bar 26.

The two cross bars have central offset portions 27 and 28 respectively, to which the ends of the diaphragm 3 are secured by hooking elements 29, 30.

The connecting rod 4 is slidable axially along each of the cranks 1 and 2. A similar sliding connection is provided between the drive crank 1 and an actuating arm 31 which is pivoted to the bowl at 32 and is provided with a drive connection with the actuating lever 7. An overcenter toggle spring 33 is provided for the arm 31 for a purpose to be explained later.

Extending on either side of the outlet port 6, are two splash guards 11, which are closely adjacent to the sides of the diaphragm 3. In actual use, when opening diaphragm, the actuating lever 7 is turned 6° or 8°, which takes up the free movement of the drive arm 1. This free movement of the drive arm 1 breaks the sealing action of the diaphragm 3 away from the bowl outlet 6. It also moves the connecting rod 4 in a direction towards the driven crank 2, thus engaging the bottom of the slots in the connecting rod 4 against driven crank 2. When the rod 4 is engaged against the driven crank 2 the diaphragm is in a slack condition between the cranks.

Further rotation of the actuating lever 7 causes the drive crank 1, the connecting rod 4, and the driven crank 2 as well as the diaphragm 3 all to move as an assembly. This rotary movement of the entire assembly continues until the drive crank 1 reaches a drive stop 8 formed on the splash guards 11. This position of the assembly provides for full opening of the bowl outlet port 6, this giving an unimpeded full flow emptying of the toilet by gravity.

This fully open position also provides for the emptying and drainage of the membrane 3 itself. In this position it drains completely. In fact from the half-way open position to the fully open position when the drive crank 1 is against the crank stop 8, the diaphragm is fully draining.

The closing operation is performed by rotating the actuating lever 7 in the opposite direction to that used previously. During the first 6° or 8° of rotation, the drive crank 1 moves farther away from the driven crank. This separating action is permitted by the elongated slot in the end of the connecting rod 4. At the end of this slight movement, the membrane 3 becomes taut and pulls the driven crank 2 along with it. Thus all the units are once again moving as an assembly and continue to do so until the driven crank 2 reaches its stop 10 again formed on the splash guards 11. This position is illustrated in both FIG. 4 and FIG. 6.

The provision of the two toggle springs 5 and 33 ensures the holding of the lid in the open position as illustrated in FIG. 5 and the closed position as illustrated FIG. 6, the two springs operating as over center springs. Although the driven crank 2 is abutting the stop 10 in the closed position, the drive crank 1 continues to move farther away from the driven crank 2 and towards the right as viewed in FIG. 6. This is assisted by the toggle springs 5 and is only halted by the taut condition of the diaphragm 3 which is now pulled tightly against the bowl outlet port 6 thereby effecting a seal. The toggle springs also take up any slack resulting from permanent stretch of the diaphragm 3, or from variations in the length of the diaphragm 3 during manufacture.

As can be seen particularly from FIG. 3, the diaphragm 3 in its closed or sealing position is bounded on two of its sides by the splash shield 11. Such shields are advantageous because portable toilets are used on boats, caravans and other vehicles when in motion. This vehicular motion causes agitation and splashing of the toilet bucket contents.

It will be seen that the construction of the present invention overcomes the problems of manufacturing a mechanically sealed toilet of this type described earlier, in which a mechanical flap valve swings downwardly into the contents of the bucket. The swinging mechanism of the present invention solves this design problem.

When the toilet has been used, and the mechanism moved to its open position as illustrated in FIG. 5, the pump 21 may be actuated to flush the bowl whereupon the valve can then be moved to its closed position. If desired, a further flush can partly fill the bowl for subsequent use. The diaphragm is preferably made of a non-creep material, such as neoprene. The tank 16 is filled by pouring water into the filler opening 19 until the ping-pong ball therein appears near the top of this opening.

When it is desired to empty the bucket portion 12, a cap 34, covering an outlet opening 35 is removed by unscrewing and the toilet is tipped up using the handle 14 and a further handle formed by a recess in the bottom of the bucket section 12.

It is claimed:

1. A toilet comprising a bowl having an outlet port, a flexible diaphragm, means supporting said diaphragm for movement between a first position in which said diaphragm closes said outlet port and a second position in which said diaphragm uncovers said outlet port, and said means being operable to tension said diaphragm into contact with said outlet port when said diaphragm is in said first position.

2. A toilet according to claim 1, wherein the diaphragm is formed of rubber or rubberized fabric.

3. A toilet comprising a bowl having an outlet port, a flexible diaphragm movable between a first position in which it closes said outlet port and a second position in which it uncovers said outlet port, and means to tension said diaphragm into contact with said outlet port when it is in said first position, said means including two movable members between which said diaphragm is supported, one member abutting a stop in the first position and the other member then being resiliently urged away therefrom to tension the diaphragm into contact with said outlet port.

4. A toilet according to claim 3, wherein the two movable members are two pivotable crank members, one being secured to one end of said diaphragm and the other being secured to the other end of said diaphragm.

5. A toilet according to claim 4, wherein said crank members are pivotable about different axes.

6. A toilet according to claim 4, wherein the crank members each have cross bars, upon which the ends of the diaphragm are mounted, the cross bars being so disposed in the first position of the diaphragm that the outlet port extends beyond the straight line connecting the two cross bars.

7. A toilet according to claim 5, wherein a tension spring is arranged as an overcenter spring, to urge said other crank, in said first position, to tension said diaphragm and in said second position, to urge said diaphragm into the open position.

8. A toilet according to claim 7, and including a second stop to restrain said other crank when the diaphragm is in said second position.

9. A toilet according to claim 4, and further including a connection member joining said cranks together, said connecting member being slidable with respect to at least one of said cranks.

10. A toilet according to claim 9, wherein an actuating lever is pivotably mounted with respect to the bowl and is slidably connected to said other crank, whereby rotation of said actuating lever initially causes pivoting of said other crank, in a direction to release the tension in the diaphragm, and then pivoting of said two cranks together, to move the diaphragm to its second position.

11. A toilet according to claim 1, and including guards extending on either side of said diaphragm and said outlet port, parallel to the direction of movement of said diaphragm from its first to its second position, said guards being closely adjacent to the diaphragm at least in its closed position.

12. A toilet according to claim 1, which includes a support bucket and wherein said bowl is mounted on said support bucket with 12. outlet port arranged within said support bucket.

13. A toilet according to claim 12, wherein said bucket is provided with a closable outlet port.

14. A toilet according to claim 1, wherein a lever is connected to said means, said means being responsive to movement of said lever to move said diaphragm from its first position to its second position when it is desired to flush the bowl.

15. A toilet according to claim 14, which includes a manually operable pump and a water tank to which the pump is connected, said pump discharging to at least one outlet positioned at the periphery of the bowl so that the discharged water will create a vortex pattern in the bowl.

16. A toilet according to claim 15, wherein a length of tube is connected to the pump and extends around the bowl and is provided with a number of outlets opening into the bowl.

17. A toilet according to claim 1, wherein the bowl is provided with a tiltable seat and cover, and wherein said cover is provided with means to lock the cover in its closed position and a lifting handle for lifting the toilet bodily.

18. A toilet according to claim 17, wherein the lifting handle includes means to urge said handle resiliently downwardly, so as to be flush with the top of said cover, said handle being liftable initially to enable the fingers of a user to pass under and thereafter to lift the toilet bodily.

* * * * *

UNITED STATES PATENT OFFICE
CERTIFICATE OF CORRECTION

Patent No. 3,939,501          Dated February 24, 1976

Inventor(s) Frank T. Sargent

It is certified that error appears in the above-identified patent and that said Letters Patent are hereby corrected as shown below:

Column 6, claim 11, line 10, after "position.", delete "12. A toilet according to". Same claim, delete lines 11 and 12. Column 6, claim 12, correct to read as follows: --A toilet according to claim 1, which includes a support bucket and wherein said bowl is mounted on said support bucket with said outlet port arranged within said support bucket.--

Signed and Sealed this

Sixth Day of July 1976

[SEAL]

Attest:

RUTH C. MASON
Attesting Officer

C. MARSHALL DANN
Commissioner of Patents and Trademarks